July 9, 1968 W. GLAMANN 3,391,584

PLURAL POWER PATHS VEHICLE TRANSMISSION

Filed Jan. 21, 1966 4 Sheets-Sheet 1

INVENTOR
WILHELM GLAMANN
BY
Tweedale & Gerhardt
ATTORNEYS

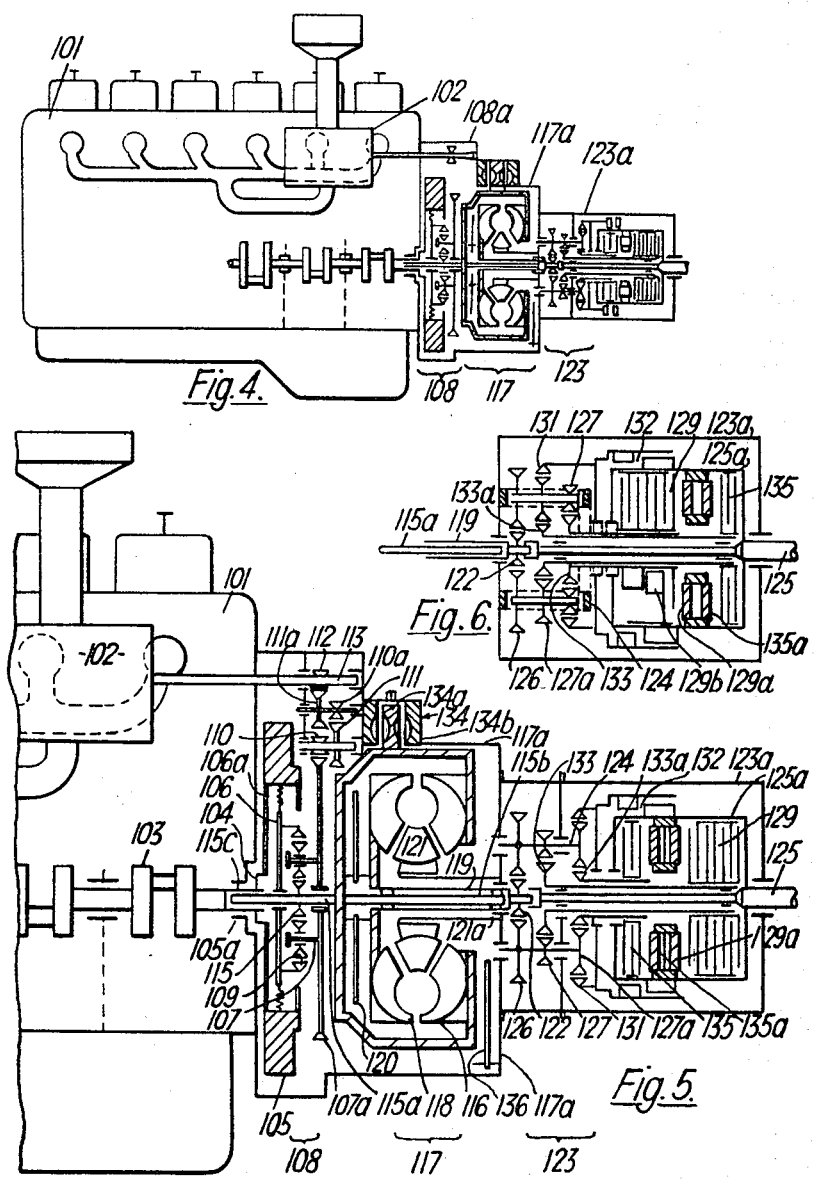

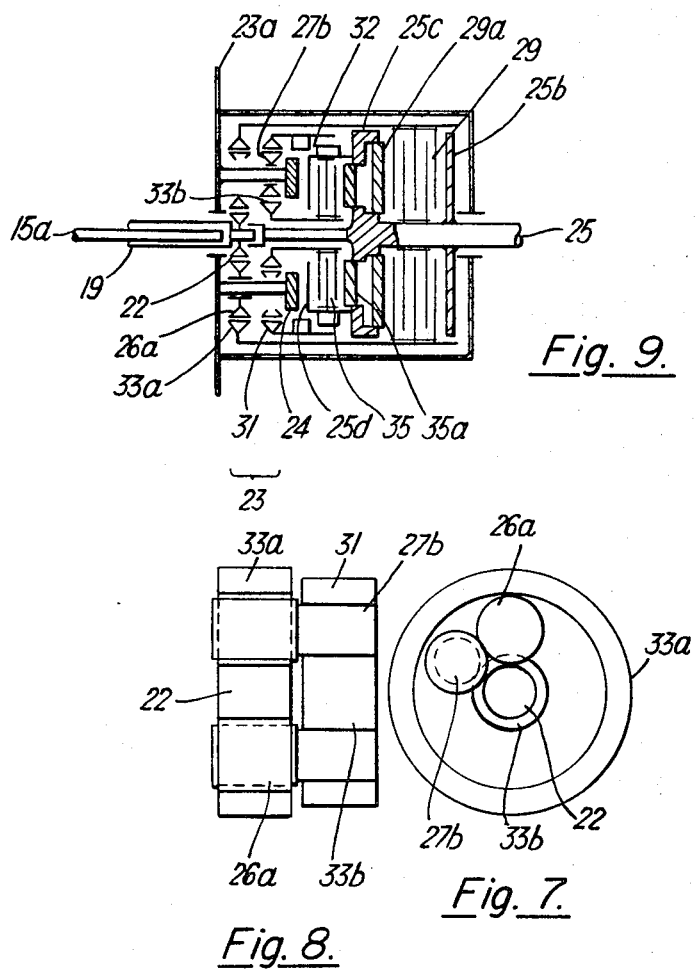

United States Patent Office 3,391,584
Patented July 9, 1968

3,391,584
PLURAL POWER PATHS VEHICLE
TRANSMISSION
Wilhelm Glamann, 8 Lehmbacher Weg,
Forsbach, Bezirk Cologne, Germany
Filed Jan. 21, 1966, Ser. No. 522,241
Claims priority, application Germany, Jan. 27, 1965,
G 42,682; Sept. 21, 1965, G 44,742
13 Claims. (Cl. 74—674)

ABSTRACT OF THE DISCLOSURE

Power transmission with a speed step-up gear unit driving a hydrodynamic torque converter in turn driving a multiple speed gear unit having a plurality of step-down ratios, the speed step-up gear comprising a differential gear unit also driving a supercharger, with one or more brake units connected to the transmission to provide various degrees of braking.

---

The invention relates to internal combustion engine transmission assemblies in which the engine drives an input element of a three element differential gear, a first output element of which drives a supercharging compressor which delivers pressurised air to the engine and a second output element of which drives the vehicle through a hydrodynamic torque converter and a gear train incorporated in a shift gearbox. Such transmission assemblies are referred to hereinafter as "transmission assemblies of the type referred to."

In previously proposed transmission assemblies of the type referred to the engine has been connected to the planet carrier of an epicyclic planetary gear which constitutes the three element differential gear train, the supercharging compressor has been connected to the sun wheel and the vehicle drive to the annulus. By this means an inherent overdrive ratio is obtained between the engine and vehicle drive. This allows the torque transmitted through the converter to be somewhat smaller than it would be if carrying full engine torque. The size of the torque converter and the gear box is however still excessively large and it is an object of the present invention to achieve a reduction in size of the torque converter and transmission components while enabling the transmission to transmit an increased range of horsepower.

According to the invention there is provided an internal combustion engine transmission assembly of the type referred to in which there is a speed step-up ratio between the engine and the torque converter and in which the one or more speed ratios in the shift gearbox are all speed step-down ratios from the torque converter to the gear-box output.

Preferably the three element differential gear is constituted by a planetary epicyclic gear, its sun gear being connected to the torque converter to provide a high speed step-up ratio thereto, and at least two speed step-down ratios being provided in the shift gearbox, one of these step-down ratios being greater and the other lower than the said step-up ratio.

Figure 1:
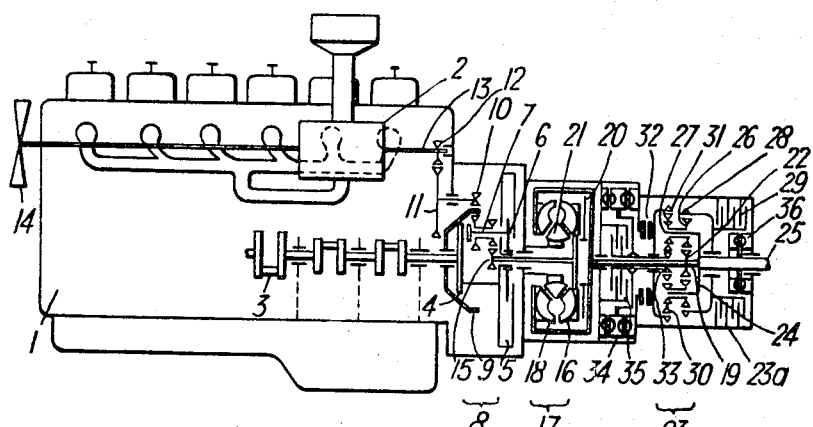
Figure 2:
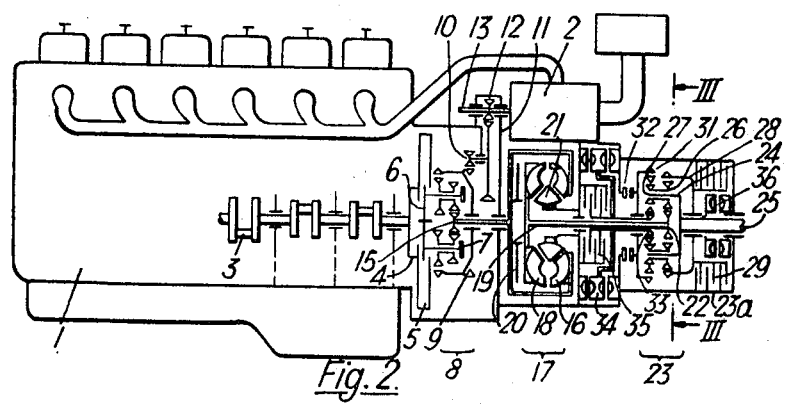
Figure 3:
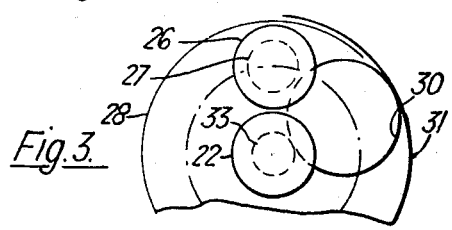
Figure 11:
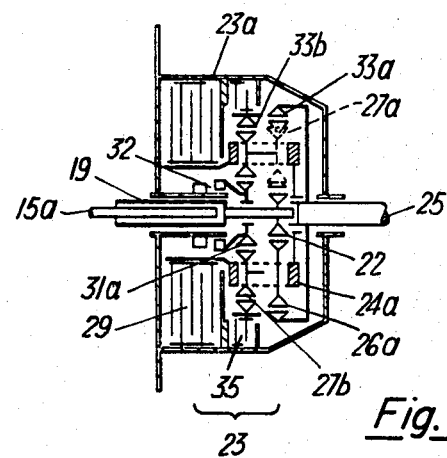
Figure 10:
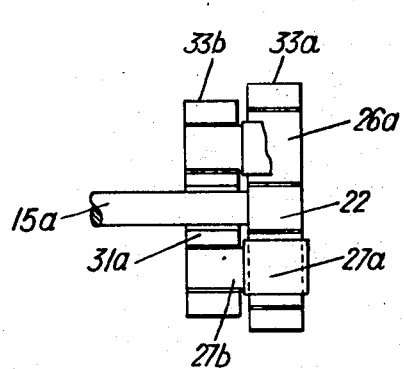

Preferably also, transmission parts behind the torque converter are arranged as follows behind each other:

(a) In an external, cylindrical annular space around the central axis;

(1) A large hydrodynamic brake
(2) Part of a claw clutch
(3) Outer parts of the shift gearbox
(4) A multiple-disc clutch for a forward gear (b) In a coaxial, cylindrical, inner annular space;

(1) A multiple-disc clutch for a forward gear (2) Part or the whole of a claw clutch
(3) Inner parts of shift gearbox
(4) A small hydrodynamic brake Embodiments of the invention will now be described, by way of example only, with reference to the accompanying drawings in which:

FIG. 1 is a general arrangement drawing of a transmission assembly according to one embodiment of the invention;
FIG. 2 is a similar drawing of a second embodiment;
FIG. 3 is a cross-section on lines III—III through the shift gearbox of FIGS. 1 and 2;
FIG. 4 is a general arrangement drawing of a third embodiment;
FIG. 5 is an enlarged view of the transmission assembly of FIG. 4;
FIG. 6 shows an alternative form of shift gearbox; and
FIGS. 7, 8 and 9 show another form of shift gearbox.
FIGS. 10 and 11 show still another form of shift gearbox.

Referring to the drawings FIGS. 1 and 2 show an internal combustion engine 1 which is supercharged by means of a supercharger blower 2. The crankshaft 3 of the internal combustion engine drives, by way of a flange 4, a primary flywheel mass 5 which includes a vibration modulator drive, through vibration damping members, to a secondary flywheel mass 6 which is connected to the planet carrier 7 of a double-row differential gear 8. The annulus 9 of the latter drives the compressor 2 through intermediate gearwheels 10, 11 and 12 and a shaft 13 which also drives a cooling fan 14. The sun wheel 15 of the differential gear 8 is directly connected to the pump or impeller 16 of a "Fottinger" torque converter 17 the turbine 18 of which drives a central shaft 19. A multiple-disc clutch 20 permits the turbine of the torque converter to be firmly coupled to the pump 16, so that the torque converter in the upper speed range can automatically be "locked up." A flow guide-wheel 21 is mounted in the usual manner in the torque converter on a free-wheel supported on a rigid tube.

The centre shaft 19 drives a primary sun wheel 22 of a planetary shift gearbox 23. The planet carrier 24 of this shift gearbox 23 is connected to an output shaft 25. A large diameter set of primary planet wheels 26 meshes at the inner periphery with the sun wheel 22 and at the outer periphery with a primary annulus 28 the movement of which can be arrested by means of a multiple-disc clutch 29. A small diameter set of primary planet wheels 27 meshes with secondary plant wheels 30 (see FIG. 3) which engage at their outer periphery with a secondary annulus 31 the movement of which can be arrested by means of a claw clutch 32. The planet wheels 26 and 27 together constitute a stepped single planet wheel. The secondary planet wheels 30 (FIG. 3) also mesh on the inside with a secondary sun wheel 33 (FIG. 3), which is drivingly connected to the rotor of a hydrodynamic brake 34. The secondary sun wheel 33 and the rotor of the hydrodynamic brake 34 can have their movement arrested by a second multiple-disc clutch 35. The rotor of a second, considerably smaller, hydrodynamic brake 36 is driven directly from the output shaft 25 which is supported together with the remainder of the parts of the shift gearbox 23 in a casing 23a.

The arrangement shown in FIG. 2 differs from the FIG. 1 embodiment in the disposition of the flywheel masses, differential gear 8 and torque converter, but is generally similar to FIG. 1 and like parts have been indicated by the same reference numerals in both figures. Both arrangements are reproduced to show variations in details within the ambit of the invention.

In FIG. 1, the split transmission is located between the engine and the flywheel masses and includes a vibration modulator in the flywheel and double planetary gears. The drive of the torque converter is effected in FIG. 1 by engagement on the inside of the pump impeller, whilst in FIG. 2 the same is effected by meshing on the outside. The arrangement in FIG. 1 has the advantage that two central shafts of about the same average length are used, whilst in FIG. 2 a short and a long central shaft are necessary. The arrangement in FIG. 1 is advantageous in that with the high shaft speeds which arise whirling must be taken into account and both shafts in the FIG. 1 embodiment can be designed to the same whirling speed limitation.

In operation, the sun wheel 15 of the differential gear 8 receives only a small fraction of the torque of the engine but a major portion of its motion output, and transmits this motion to the pump 16 of the torque converter 17. As a result of the relatively low torque which the sun wheel 15 transmits, the torque converter, and the planetary shift gearbox 23 driven by it, can be relatively small in size but will have a high speed of rotation. The relative dimensions shown in FIGS. 1 and 2 are not representative of the actual relative dimensions.

The high transmission ratio between engine and the torque converter results in the amplitudes of the torsional vibrations of the engine being intensified. These can cause appreciable damage to the transmission members. To prevent this, the torsional vibrations of the engine are damped within the flywheel by vibration damping members (not shown) so that only driving forces in one direction of rotation act on the planet carrier 7.

The pump 16 of the torque converter transmits its small torque to the turbine 18 in the usual manner unless they are locked to each other by the clutch 20, which will generally be the case during vehicle operation under normal conditions. From the turbine, the small torque is further transmitted to the primary sun wheel 22 of the planetary shift gearbox 23. This transmits the torque to the two sets of planetary gears 26 and 27 the disposition of which is designed to be the same as that of the double-row of planetary gears in the differential gearbox 8.

The small torque which has been accepted by the sun wheel 22 is transmitted to the output shaft 25 with a large speed step-down ratio because the output shaft is connected to the planet carrier 24 and no provision is made for a direct drive through the planetary shift gearbox 23. This ensures that the high intermediate speed of rotation of the shafts between the sun wheels 15 and 22 is brought back down again to a relatively low output speed of the shaft 25.

The following occurs during the various operating phases of the transmission units shown in FIGS. 1 and 2, which both incorporate two forward speeds and one reverse.

(i) In the neutral state of the transmission all the clutches 29, 32 and 35 are released. The transmission can accordingly rotate without torque being transmitted to the output shaft 25.

(ii) If the multiple-disc clutch 29 is engaged, the movement of the primary annulus 28 is arrested. This selects the low forward transmission ratio, the power path being sun wheel 22, primary planet wheel 26, planet carrier 24 and shaft 25. Both the large supplementary brake 34 and the small supplementary brake 36 can be used because the rotors of both are turning when this ratio is selected.

(iii) If the multiple-disc clutch 29 should be released during operation, if need be under full load, oil pressure is routed at the same time to the multiple-disc clutch 35 so that the secondary sun wheel 33 is arrested. This selects the fast forward transmission ratio; the power path being sun wheel 22, primary planet wheel 26, planet carrier 24 and shaft 25 as before. The large hydrodynamic brake 34 cannot be used since its rotor is stationary. The small hydrodynamic brake 36 is, however, available and, on account of its high speed, is sufficient for the braking in the high ratio which only requires efficient supplementary braking in its upper speed range.

(iv) To engage reverse gear, the vehicle must be brought to a standstill unless, instead of the claw clutch 32 a multiple-disc clutch is provided. Provided, when the vehicle is stationary and with the torque converter turbine stationary, that at least one of the multiple-disc clutches 29 and 35 is engaged, which is normally the case, the secondary annulus 31 is likewise stationary and the claw clutch 32 can be engaged without difficulty. When from the neutral position, reverse gear is to be engaged, whilst the transmission is idling, the annulus 31 must previously have been arrested, which is best done by actuating oil pressure for one of the multiple-disc clutches 29 or 35. Since, in most cases, the claw clutch 32 will likewise be operated by oil pressure, it will be sufficient if the reversing gear is actuated by means of a three-way cock to obtain the required effect. When reverse gear is used, both the hydrodynamic brakes 34 and 36 are available.

To lock the transmission, both multiple-disc clutches 29 and 35 are engaged, or one multiple-disc clutch 29 or 35 and the claw clutch 32. In this condition the engine can idle by virtue of slippage between the pump 16 and turbine 18 of the torque converter.

The high revolutions and the low torque at the converter, are reconverted in the planetary shift gearbox 23 to values which are suited to the vehicle requirements. If the step-up speed ratio in the differential gearbox 8 amounts to about 1:2.3, the step-down ratio in the planetary shift gearbox in high gear will amount to about 2:1 and in low and reverse gear to about 4:1. From this it is apparent that the output shaft only turns slightly faster than the engine, whilst in slow and reverse gear the maximum speed of the output shaft only amounts to rather more than 60% of the maximum speed of the engine. To achieve such advantageous ratios, and, at the same time, to obtain a small economic transmission, the components of which are only moderately stressed, the individual members of the planetary shift gearbox should be provided as specified above.

The relative positions of the clutches, brakes and the planetary shift gearbox as illustrated, allow of a particularly compact arrangement in which the transmission components behind the torque converter are, in general, arranged one behind the other as follows:

(a) In an external, cylindrical annular space around the central axis;

(1) The large hydrodynamic brake
(2) If necessary, part of the claw clutch
(3) The outer parts of the planetary shift gearbox
(4) The multiple-disc clutch for the slow forward gear (b) In a coaxial, inner cylindrical annular space:

(1) The multiple-disc clutch for the fast forward gear
(2) Part or the whole of the claw clutch
(3) The inner parts of the epicyclic
(4) The small hydrodynamic brake A particularly satisfactory embodiment of the invention is obtained by using the following relative dimensions:

(a) The primary sun wheel 22 of the planetary shift gearbox 23 is about the same pitch circle diameter as the diameters of the large primary planet wheels 26.

(b) The small primary planet wheels 27 and the secondary sun wheel 33 have a pitch circle diameter about ⅓ smaller than the large primary planet wheels 26.

(c) The secondary planet wheels 30 have a pitch circle diameter about ⅓ larger than the large primary planet wheels 26.

The arrangement of the hydrodynamic brake in the vicinity of the planetary shift gearbox 23 should be noted.

Such brakes can be driven direct from the output shaft behind the gearbox so that they will function independently of choice of gear, but suffer from the drawback that at the higher vehicle speeds large power losses occur due to the fact that air in the brake acts as a braking medium. Nevertheless, in order to have available a supplementary brake in addition to the wheel brakes there is provided, a second, extremely small, hydrodynamic brake directly coupled to the output shaft. The small brake is not such a source of high power loss when running empty.

In FIGS. 4, 5 and 6 the reference numerals are prefixed by the addition of a numeral 1 or 10 to distinguish them from the corresponding reference numerals of FIGS. 1 to 3. In FIG. 4, the internal combustion engine 101 is supercharged by means of a compressor 102. A planetary differential gear 108 is fited in a housing portion 108a behind the engine 101. A torque converter 117 is accommodated in a housing section 117a and a planetary shift gearbox 123 is fited in a housing section 123a. It should be noted that the space taken up by the transmission in FIGS. 4, 5 and 6 is considerably less than in FIGS. 1, 2 and 3 although all parts have been drawn to the same scale.

Referring to FIGS. 5 and 6, the crankshaft 103 of the engine 101 drives, by means of a flange 104; a primary flywheel mass 105, which includes a vibration modulator consisting of antivibration members 106a which drivingly connect the primary flywheel mass 105 to a secondary flywheel mass 106. The latter is rigidly connected to the annulus 109 of the planetary differential gear 108. The planet carrier 107 of the latter drives the supercharger blower 102 through transmission gearwheels 110, 111, 110a, 111a, 112 and a shaft 113. An inner sunwheel 115 of the planetary differential gear 108 is connected through a central intermediate shaft 115a, direct to the pump 116 of the torque converter 117 whose turbine 118 drives a hollow shaft 119. Within this hollow shaft 119 the central intermediate shaft 115a is journalled for free rotation on a bearing 115b carried by the shaft 119. Another support 115c for the intermediate shaft 115a is located in the flywheel bearing 105a of the engine 101. A "lock-up" clutch 120 permits the turbine 118 of the converter to be firmly coupled to the pump 116 so that the converter can automatically become a rigid coupling in the upper speed-range. The guide-wheel 121 of the torque converter is mounted in the normal way through free-wheels on a stationary tube 121a.

The central hollow shaft 119 drives a primary sunwheel 122 of the planetary shift gearbox 123. The planet carrier 124 of this gearbox is rigidly connected to the housing 123a (FIG. 6) or forms an integral part of same (FIG. 5). The planet wheels each consist of 3 stages which are rigidly connected to each other. The largest planet wheels 126 mesh at their inner periphery with the sunwheel 122 but do not mesh at their outer periphery. The smallest planet wheels 127 mesh at their inner periphery with one secondary sunwheel 133 which can be drivingly connected to the output shaft 125 through a multiple-disc clutch 129. For this purpose, a cylindrical clutch casing 125a is rigidly mounted on the output shaft 125. Intermediate diameter planet wheels 127a mesh on their inner periphery with another secondary sunwheel 133a which can also be drivingly connected to the output shaft 125 through a further multiple-disc clutch 135. As seen in FIGS. 5 and 6 the intermediate or small diameter sets of planet wheels 127, 127a mesh at their outer periphery with an annulus 131 which, by means of a dog or claw clutch 132, can be drivingly connected to the clutch casing 125a and thus with the output shaft 125.

If necessary the planet wheels of both of the intermediate and small diameter stages can mesh with respective annulus wheels, these being connectible to the clutch casing 125a through dog clutches, so that, are required, either the one or the other annulus wheel can be firmly connected to the output shaft 125. The larger diameter planet wheels 126 can also be made to mesh in this manner with an annulus which can be drivingly connected through a suitable clutch with the clutch casing 125a. The dog or claw clutches may also be replaced by multiple-disc clutches.

On the pump 116 of the torque converter, the rotor 134a of a hydrodynamic brake 134 is rigidly mounted, the stators 134b being fastened to the housing 117a so that it is possible by means of this brake, to retard the speed of the pump. If required, a multiple or single plate brake provided between the pump and the casing of the converter housing 117a can serve this purpose as shown at 136 in FIG. 5. The operation of the multiple-disc clutches 129 and 135 is effected in conventional manner through annular pistons 129a and 135a.

In operation, the sunwheel 115 receives only a fraction of the torque of the engine and likewise receives all except a small fraction of its motion. This means that the sunwheel 115 rotates very rapidly whilst the planet carrier 107 runs extremely slowly because it only passes a small fraction of the motion of the engine to the supercharger compressor 102 and absorbs a torque which is appreciably higher than that of the engine. This arrangement is different from that shown in FIGS. 1, 2 and 3 where the torque imparted to the supercharger compressor from the planetary differential gear 8 is considerably higher than that imparted to the sunwheel 115 but nevertheless is considerably lower than the torque delivered by the engine.

The observations which have been made above with reference to FIGS. 1, 2 and 3 regarding the relative measurements, the reduction gearing to the sunwheel 115 and the speed of the same, as well as regarding the torsional vibration characteristics, remain unaltered in the present case, both qualitatively and quantitatively.

The power which is transmitted by the engine 101 to the sunwheel 115 is passed on to the pump 116 of the torque converter 117. The pump impeller 116 of the torque converter, transmits a small torque to the turbine 118 when the clutch 120 is not "locked-up." A locked-up condition of clutch 120 can also be used to facilitate the starting of the engine when this is desired. From the turbine wheel 118 of the converter, an increased torque can be transmitted as required, in the converting range of speeds, through the hollow shaft 119 to the primary sunwheel 122 of the planetary shift gearbox 123. This passes on the drive to the shafts of the three sets of planet wheels 126, 127, 127a which are mounted on an axis which can rotate in the planet carrier 124 or the housing 123a. The planet wheels 126, 127, 127a could also be mounted on fixed axes for rotation together in the same way as in the planetary gear 8 in FIGS. 1 and 2.

Each of the planet wheels 126, 127 or 127a can basically be selected to pass on the drive, such a selection being chosen to meet a specific torque requirement. The selection entails a torque increase and at the same time a conversion of the high intermediate speed of the intermediate shafts 115a and 119 into a lower output speed of the shaft 125 this being important when the shaft 125, as is usual, is a transmission or cardan shaft, the permissible maximum speed of which is limited by whirling of the shaft.

In the various operating conditions of the driving mechanism, the following occurs:

(i) In the neutral state of the transmission the clutches behind the planetary shift gearbox are all released. The transmission can accordingly rotate without any torque or movement being transmitted to the output shaft.

(ii) If the multiple-plate clutch 129 is engaged by oil pressure, then the smallest diameter secondary sunwheel 133 is directly coupled to the output shaft 125. This selects the low forward gear ratio, which preferably amounts to approximately a 4:1 speed step down ratio.

(iii) If the multiple-plate clutch 135 is engaged by oil pressure then the intermediate diameter secondary sunwheel 133a is directly coupled to the output shaft 125.

This selects the high forward gear ratio which preferably amounts to approximately a 2:1 speed step down ratio.

(iv) To engage the reverse gear (or one of the reversing gears), the vehicle must be brought to a halt, unless in place of the dog clutch 132 a multiple plate clutch is provided. Provided that at least one of the clutches 129, 135 is engaged, the dog clutch 132 can be easily engaged when the vehicle is stationary since the planet wheels, and with them the annulus 131, are then likewise stationary. The observations made above with reference to FIGS. 1, 2 and 3 are applicable in this case and also for changing to reverse gear from neutral.

(v) To lock the transmission both multiple-plate clutches or one multiple-plate clutch and the dog clutch 132 are engaged.

(vi) The operation of the hydrodynamic brake 134 is, by contrast with the embodiment of FIGS. 1, 2 and 3, effective on all gears. This brake effects a controllable slowing down of the converter pump 116 which can reduce the pump speed to a low value, or is capable of stopping the pump 116 completely. In both cases, the torque converter is used as a supplementary hydrodynamic brake since on braking the turbine 118 will be driven fast by the output shaft 125 whilst the brake pump 116 will rotate slowly or be stationary. When the hydrodynamic brake 134 is in use it can be filled or emptied in a controlled manner, this avoiding the need for close control over filling of the converter for controlling its action as a brake. When using the brake 136 in FIGS. 1, 2 and 3 it is advisable that the filling of the torque converter should be controllable so as to regulate its action as a brake.

As explained with reference to the embodiment shown in FIGS. 1, 2 and 3, there is a speed step-up in the planetary differential gear between the engine and the torque converter and this preferably amounts to a ratio of between 1:1.5 and 1:3. On the other hand however, there must also be the highest possible step-up gearing between the planetary differential gear and the supercharger compressor, because the latter must rotate very quickly and absorb only a fraction of the engine torque. Hitherto the usual method of dividing the drive to meet these requirements has been to connect the engine to a single row planet carrier and the annulus to the torque converter leaving the sun wheel to drive the compressor. This will then result in a fast gear ratio, both to the converter and, with the aid of a further gear train, to the supercharger blower. This arrangement has, however, two disadvantages which are overcome in the embodiment shown in FIGS. 1, 2 and 3. Firstly, the planet wheels will rotate very quickly about their own axes; this is overcome in the FIGS. 1 to 3 embodiment by furnishing the planet carrier with double planets. It is only by employing double planets that, in the arrangement shown in FIGS. 1, 2 and 3, gear ratios to the sunwheel 115 of between 1.5:1 and about 2.25:1 can be obtained. Above these values, the required ratio could be obtained with simple planets but these would rotate considerably faster around their own axes than the sunwheel 115 and since the planet carrier itself rotates in the opposite direction to that of the planets and with higher speed (namely that of the internal combustion engine), excessively high centrifugal forces would be set up in the planet bearings. The embodiment shown in FIGS. 4, 5 and 6 shows how a single row of planets can be used in the planetary differential gearbox while maintaining the step-up ratios required by the invention.

If it is required to drive the compressor from the planet carrier, it can be arranged to step the speed of the compressor drive up through the speed increasing gear train 110, 111, 110a, 111a and 112. By contrast with the arrangement shown in FIGS. 1, 2 and 3 an additional countershaft and additional gear wheels 110a, 111a are provided. The planet carrier, as stated above runs at an extremely slow speed when it is being used to drive the supercharger blower. Because the power transmitted to the supercharger blower is very small and the torque conveyed through the planet carrier is considerable, being greater than the engine torque, the planet carrier will have a low speed of rotation.

When the planet carrier has a very low speed of rotation there will not be any high centrifugal force exerted on the planet wheel bearings. With a driven planet carrier, the planet wheels will no longer run considerably faster than the sunwheel 115, but more slowly. Single row planet wheels in these circumstances neither run up against the difficulty of their own high speed of rotation, nor of centrifugal force imposing a high load on the bearings. With this arrangement gear ratios from the engine to the sunwheel of between 1.5:1 and 3:1 can be obtained, without difficulty, from single row planet wheels. The embodiment shown in FIGS. 4, 5 and 6 thus avoids the need to use double row planet wheels in the planetary differential gearbox.

The arrangement for supporting the converter by the central intermediate shaft 115a makes it possible for the shaft 115a to be supported satisfactorily in the housing in an undivided form to extend between the differential gear and the planetary shift gearbox so that problems of strength and vibration, which are inherent in such a shaft, can be overcome without difficulty.

The planetary shift gearbox according to FIGS. 4, 5 and 6, has small diameter dimensions. This is possible because the high speed step-down gear ratios which have to be produced in the shift gearbox are split into two steps between four gear wheels or two pairs of gear wheels in such a way that the individual gear wheels have small diameters. By this means, the total diameter of the gear wheel section of the planetary shift gearbox, by comparison with the arrangement shown in FIGS. 1, 2 and 3, remains small as compared with the diameter of the converter despite the small dimensions of the latter.

The construction of the planetary shift gearbox of FIGS. 4, 5 and 6, is further simplified in that the central shaft 125 of this gearbox has a small diameter which only increases at its output end where a considerable increase in diameter is necessary for the transmission of the high output torques. This construction is rendered possible by the fact that the clutch plates for the gear wheels 133 and 133a are supported on the shafts which also support those gear wheels and no torque enters the output shaft in front of the gears 133 and 133a support shafts.

It can prove of advantage to replace the larger of the two multiple-disc clutches 129 by a dog clutch 129b (FIG. 6) with pre-connected synchronizing discs or "synchromesh," to avoid the idling power-loss of a disengaged multiple-disc clutch. This is particularly noticeable with the larger of the two multiple-disc clutches, since it idles when running in a fast forward gear. Such an arrangement is illustrated in the lower half of FIGURE 6. In such a case, considerable and unacceptable stress will be placed on the synchronizing device. In order to relieve the load on the synchronizing device, the converter may be partially or wholly emptied. An adjustable filling converter acting as a drive disconnector in this way can also be used for regulating the action of the disc brake 136.

A further variation in the planetary shift gearbox 23 is illustrated in FIG. 7. Here the drive is through a Ravigneaux assembly with a fixed planet carrier 24. The primary planet wheels 26a of the Ravigneaux assembly mesh on the inside with a primary sun wheel 22, and on the outside with an annulus 33a, which can be rigidly attached to the drive shaft 25 by a disc-clutch 29. For this purpose the output shaft 25 carries plates 25b and 25c, which are rigidly attached to it. The secondary planet wheels 27d (here shown in two stages) of the Ravigneaux assembly mesh on the inside with a secondary sunwheel 35b, which can be rigidly attached to the output shaft 25 by a disc-clutch 35, and on the outside with a secondary annulus 31, which, by means of the claw-clutch 32, can be rigidly attached to a small clutch-housing 25, and through this to the output shaft 25.

In operation, the sunwheel transfers the speed of rotation taken up to the primary satellite-wheels 26a. These either pass it on to the crown-wheel 33a (is first gear is engaged by means of the disk-clutch 29), or to the secondary satellite-wheels 27b. These in turn transfer the power either to the secondary sunwheel 33b (if second gear is engaged by the disk-clutch 35), or to the secondary crown-wheel 31 (if the claw-clutch has been engaged in order to obtain reverse gear). If neither claw nor disk-clutch are engaged, neutral position is obtained.

An advantage of the variation shown in FIG. 7 is that the direction of rotation of the output shaft in the forward gears is brought back to that of the crank-shaft 3 of the drive-assembly, while in reverse the rotation of the output shaft, as is normal, is opposite to that of the crank-shaft 3 of the drive-assembly.

A further advantage is the reduction of the number of planet-assemblies from three to two (as compared with the previous embodiments) although the planet carrier is fixed.

In the embodiment shown in FIG. 11, the primary satellite wheels 26a of the Ravigneaux gear train mesh on the inside with the driving sunwheel 22, and on the outside with a primary ring gear 33a, which is drivingly connected to the output shaft 25. The secondary planet wheels of the Ravigneaux gear train mesh (in the representation by means of a large diameter portion 27a) with the primary satellite wheels 26a. On the other side they mesh (in the representation by means of a small diameter portion 27b) with a sunwheel 31a, which can be locked to the casing 23a by means of a dog clutch 32, and with a ring gear 33b, which can be locked to the casing 23a by means of a multi-disc clutch 35. The planet carrier 24a of the Ravigneaux gear set can be locked to the casing 23a by means of a multi-disc clutch 29.

In operation, the sunwheel 22 transmits the torque given to it to the primary satellite wheels 26a. These drive the ring gear 33a and thus transmit the power to the output shaft 25. By locking the multi-disc clutch 29, the planet carrier 24a is stopped. Thus the condition of a Ravigneaux gear train with stationary planet carrier is obtained, as continuously exists in the embodiment of FIG. 7. In this embodiment this condition exists only to obtain a gear ratio corresponding to the low forward gear, it being understood that a change of the sense of rotation takes place, so that this gear ratio is for the Ravigneaux gear train in itself, a reverse gear ratio. By locking the multi-disc clutch 35, the secondary ring gear 33b becomes stationary. This produces the gear ratio of the high forward gear, likewise with change of the drive sense. If, finally, the dog clutch 32 is engaged (as previously described by locking for a moment one of the multi-disc clutches 29 or 35), the reverse gear ratio is obtained. The drive sense remains unchanged, in this case, so that this gear represents in reality a forward gear for the Ravigneaux gear train.

In FIGS. 7 and 8 the secondary planet wheels are represented as being the so-called "long" Ravigneaux wheels, and are shown with different diameters at each side of a wheel. Whether the secondary or the primary planet wheels are "long" Ravigneaux wheels, is not important to the present invention. Neither is it necessary that the long Ravigneaux wheels be made with two different diameters for each side of such wheels. The two different portions of the "long" Ravigneaux wheels (27a and b in FIG. 8 and left and right portions respectively of gear 27b in FIG. 7) may be of the same diameter.

I claim:

1. A power transmission including a first gear unit providing an overdrive speed ratio, a hydrodynamic torque converter having an input member driven by an output of said overdrive speed ratio and a converter output member, a second gear unit between an input member connected to the output of the torque converter and an output member and providing a plurality of selectable step-down ratios, one of which is less than the overdrive speed ratio and another of which is greater than the overdrive speed ratio.

2. The power transmission of claim 1 wherein said first gear unit comprises a differential gearing having a first output member connected to the input member of said torque converter and a second output member adapted to be connected to a supercharger for an engine adapted to drive the transmission.

3. The power transmission of claim 1 wherein said first gear unit comprises a planetary gear set having a sun gear output member connected to the input member of the torque converter, a planet carrier input member adapted to be connected to an engine and a ring gear output member adapted to be connected to a supercharger drive for the engine.

4. The power transmission of claim 1 wherein said second gear unit comprises a compound planetary gear unit having a first sun gear connected to the output member of said torque converter, a planetary carrier member connected to an output shaft for the transmission, a stepped planet pinion on said carrier having a large diameter gear portion in mesh with said first sun gear and with a first ring gear and a second smaller diameter gear portion in mesh with another planet pinion mounted on said carrier and which is in mesh with both a second sun gear and a second ring gear, brake means for holding said first ring gear against rotation to provide said step down ratio that is greater than the overdrive speed ratio and brake means for holding said second sun gear against rotation to provide said step down ratio that is less than the overdrive speed ratio.

5. The power transmission of claim 4 wherein additional brake means are provided to hold said second ring gear against rotation to provide a reverse drive to said output.

6. The power transmission of claim 1 wherein a selectively operable hydrodynamic brake is connected to a member of the second gear unit other than the output member thereof.

7. The power transmission of claim 6 wherein a second selectively operable hydrodynamic brake is connected to the output member of said second gear unit.

8. A power transmission including an input shaft, a differential gearing connected to be driven by said input shaft and having a pair of output members, a hydrodynamic torque converter having a vaned impeller member connected to one of said output members, a vaned turbine member and a vane reaction member, a rotatable housing for said torque converter connected to said turbine member, said impeller member connected to said one output member through a shaft extending into said housing, said housing forming an output member for said torque converter.

9. The power transmission of claim 8 wherein said input shaft is adapted to be directly connected to an internal combustion engine and the other of said pair of output members is adapted to be converted to a supercharger for said engine, said supercharger and torque converter each providing a reactive load for the other.

10. The power transmission of claim 9 wherein a multiple speed gear unit is connected to the housing of said torque converter, a final output member from said change speed gear unit and a selectively operable hydrodynamic brake connected to an element of said change speed gear unit other than the final output member.

11. The power transmission of claim 9 wherein a change speed gear unit is connected to the housing of said torque converter, said differential gearing providing at least some times a predetermined speed step up between the input member and said one output member whereby said torque converter is driven faster than the engine, and said change speed gear having a plurality of selected step down speed ratios, one of which is greater than the greatest speed step up provided by the differential gearing and one of which is less than such greatest speed step up.

12. The power transmission of claim 9 wherein said differential gear unit comprises a planetary gear set having a sun gear output member connected to the vaned impeller member of said hydrodynamic torque converter, a planet carrier input member adapted to be connected to the engine and a ring gear output member adapted to be connected to the supercharger drive.

13. The power transmission of claim 12 wherein a second gear unit is connected to be driven by the hydrodynamic torque converter, said second gear unit comprising a compound planetary gear unit having a first sun gear connected to said torque converter housing, a planetary carrier member connected to an output shaft for the transmission, a stepped planet pinion on said carrier having a large diameter gear portion in mesh with said first sun gear and with a first ring gear and a second smaller diameter gear portion in mesh with another planet pinion mounted on said carrier and which is in mesh with both a second sun gear and a second ring gear, brake means for holding said first ring gear against rotation to provide said step down ratio that is less than the overdrive speed ratio.

References Cited
UNITED STATES PATENTS

| | | | |
|---|---|---|---|
| 2,769,303 | 11/1956 | Lucia et al. | 74—688 X |
| 3,040,589 | 6/1962 | Chapman | 74—664 X |
| 3,311,200 | 3/1967 | Hayward | 74—688 X |

FRED C. MATTERN, JR., *Primary Examiner.*

ARTHUR T. McKEON, *Assistant Examiner.*